(12) United States Patent
Murat et al.

(10) Patent No.: US 7,481,154 B2
(45) Date of Patent: Jan. 27, 2009

(54) COOKING BASKET FOR PRESSURE COOKER COMPRISING MEANS FOR ADJUSTING THE PASSAGE OF STEAM

(75) Inventors: Marie-Pierre Murat, Fontaine les Dijon (FR); Ines Birlouez-Aragon, Paris Cedex (FR); Pascal Roland Clement Murat, Fontaine les Dijon (FR); Eric Christian Jacques Rhetat, Dijon (FR)

(73) Assignee: SEB S.A., Ecully Cedex (FR)

(*) Notice: Subject to any disclaimer, the term of this patent is extended or adjusted under 35 U.S.C. 154(b) by 590 days.

(21) Appl. No.: 10/496,616

(22) PCT Filed: Nov. 27, 2002

(86) PCT No.: PCT/FR02/04073

§ 371 (c)(1),
(2), (4) Date: Feb. 2, 2005

(87) PCT Pub. No.: WO03/045210

PCT Pub. Date: Jun. 5, 2003

(65) Prior Publication Data

US 2005/0115417 A1 Jun. 2, 2005

(30) Foreign Application Priority Data

Nov. 27, 2001 (FR) .................................. 01 15578

(51) Int. Cl.
*A23L 1/00* (2006.01)
(52) U.S. Cl. .............................. 99/337; 99/403; 99/415; 99/418; 220/314; 220/316; 220/912

(58) Field of Classification Search ........... 99/337–339, 99/403–418, 330, 444–450; 126/20, 369; 220/314–316, 912; 219/401, 429, 430, 431, 219/337, 340

See application file for complete search history.

(56) References Cited

U.S. PATENT DOCUMENTS

| 4,238,996 A | 12/1980 | Okuyama ................ 99/352 |
| 4,627,417 A * | 12/1986 | von der Becke et al. .... 126/369 |
| 5,092,229 A * | 3/1992 | Chen ...................... 99/337 |
| 5,235,904 A * | 8/1993 | Ludena ................... 99/413 |
| 5,839,357 A * | 11/1998 | Ha et al. ................. 99/337 |
| 6,723,963 B2 * | 4/2004 | Ronda .................... 219/431 |

FOREIGN PATENT DOCUMENTS

| DE | 139643 | 2/1902 |
| EP | 0165152 | 12/1985 |
| FR | 2643805 | 9/1990 |
| JP | 09224828 | 9/1997 |

* cited by examiner

*Primary Examiner*—Timothy F. Simone
(74) *Attorney, Agent, or Firm*—Thomas, Kayden, Horsetemeyer & Risley, LLP

(57) ABSTRACT

The invention provides a food-cooking basket for pressure cooking in a pressure cooker, the basket being formed by a sheet of rigid material defining a bottom and side walls of the basket. The sheet is provided with perforations that are made through the bottom and through the side walls. The basket is provided with a structure for adjusting the flow rate of steam passing through the basket via the perforations, the structure being associated with the bottom in such a manner as to enable the flow rate of steam through the perforations at least in the bottom to be adjusted. The invention is applicable to appliances for pressure cooking.

13 Claims, 5 Drawing Sheets

COOKING BASKET FOR PRESSURE COOKER COMPRISING MEANS FOR ADJUSTING THE PASSAGE OF STEAM

CROSS-REFERENCE TO RELATED APPLICATIONS

This application is a national stage application in accordance with 35 U.S.C. 371 and claims the benefit of priority under 35 U.S.C. 119 and 365 to international application PCT/FR02/04073, filed Nov. 27, 2002, which claims the benefit of priority of priority of Application No. 01/15578, filed in France on Nov. 27, 2001, each application being hereby incorporated by reference in its entirety herein.

TECHNICAL FIELD

The present invention relates to the general technical field of appliances for pressure cooking, such as pressure cookers, and more particularly it relates to food-cooking baskets which are designed to be placed in such appliances, advantageously at a certain height within the vessel, in order to cook food.

The present invention relates to a food-cooking basket for pressure cooking in a pressure cooker, said basket being formed by a sheet of rigid material defining a bottom and side walls for the basket, said sheet being provided with perforations for allowing steam in the enclosure of the pressure cooker to pass through the perforations and through the food, in particular vegetables contained in the basket.

BACKGROUND

The present invention also provides a pressure cooker for receiving a cooking basket in accordance with the invention.

PRIOR ART

In order to enable the user of a pressure cooker to cook other than by immersing the food in the liquid contained in the cooking vessel, it is necessary to make provision for a cooking basket containing the food to be integrated in the vessel together with means for supporting the cooking basket arranged in or on the walls and at a certain predetermined height in such a manner as to enable the basket to be supported at a predetermined height above the cooking liquid. It is also necessary to provide a certain number of perforations in the basket so as to enable steam to circulate not only within the enclosure of the pressure cooker, but also through the food, thereby optimizing heat exchange.

Such systems are well known and make use of baskets, generally metal baskets, having a variety of shapes and capacities, the basket support means being constituted by a removable support, e.g. made of steel wire placed on the bottom of the vessel when the user desires to perform steam cooking. There also exist support means formed by pieces fitted to the wall of the vessel (rivets) or formed by localized deformations in the wall of the vessel, these deformations supporting the basket at a predetermined height above the bottom of the vessel.

Presently-known metal baskets can be categorized in two main types.

The first type is constituted by "net" baskets obtained using interlaced or meshed steel wires and provided with a stiffening structure giving them a degree of mechanical strength. Such baskets generally give satisfaction, but they suffer from drawbacks associated with the difficulty of containing food because of their large mesh size and associated with being very difficult to clean, specifically because of the mesh which makes it difficult in particular to be sure of removing food waste. In addition, the lifetime of such baskets is short because they are relatively fragile.

The second known type of basket is formed by metal baskets obtained by stamping and including a series of perforations formed either through the bottom of the basket, or through both the bottom and the side walls. Such baskets generally give satisfaction and are acceptably easy to clean. However, their ability to ensure good heat exchange with the food is greatly variable and difficult to control.

It is also known that a balanced diet requires a regular intake of vitamins, in particular vitamin C, from fruit and vegetables which constitute the main sources. Studies undertaken on this topic have shown not only that the consumption of fruit and vegetables in the general population has been insufficient over the last few years, but further that the general trend is towards a relative drop of such consumption. One of the factors that might explain this low level of consumption and this general trend is that the potential consumer comes up against a series of constraints in use that tend to limit the consumption of fruit and vegetables, and in particular: the need to obtain provisions frequently, the need to clean them or peel them, and finally the need to perform a cooking operation on vegetables, it being understood that this constraint, which is perceived negatively, is a constraint concerning the time needed for cooking.

In general, there therefore exists a need to improve general dietary conditions, or at least to prevent them from deteriorating, and that has led to a search for solutions that enable the time required for cooking food, and in particular vegetables, to be reduced.

It is also known that vitamins are very sensitive to cooking conditions and can be completely or partially destroyed, leached out, or degraded during cooking. Amongst vitamins in general, vitamin C is the most fragile, even though fruit and vegetables contribute about 85% of dietary intake of vitamin C. It is thus extremely important to maintain as high as possible a level of vitamin C in vegetables after they have been cooked, in particular after they have been cooked.

Amongst the known phenomena concerning the fragility in cooking of the vitamin C contained in vegetables, mention can be made that vitamin C is soluble in water when it is in the form of folates, which makes it sensitive to being leached out by the cooking water. This sensitivity to being leached out is a very important factor in the loss of vitamins, and this factor varies depending on the nature and the type of the vegetable concerned. Furthermore, vitamin C is sensitive to temperature and is destroyed in proportion to the time and the temperature applied during cooking.

Finally, vitamin C is sensitive to oxidation and thus degrades correspondingly with increasing contact with air.

There thus also exists a general problem of preserving vitamins, and in particular vitamin C, while cooking vegetables in pressurized cooking appliances such as pressure cookers.

SUMMARY OF THE INVENTION

The object given to the invention seeks consequently to provide a novel food-cooking basket for use in pressure cooking in a pressure cooker, which basket makes it possible to reduce the time required to cook food while preserving the vitamins present in the food, and in particular in vegetables by reducing the phenomenon of leaching out.

Another object of the invention seeks to provide a novel food-cooking basket that is particularly simple and effective in design and utilization.

Another object of the invention is to propose a novel food-cooking basket enabling the circulation of steam within the enclosure of the pressure cooker to be optimized without disturbing the operation of the various safety members of the pressure cooker.

BRIEF DESCRIPTION OF THE DRAWINGS

Other objects and advantages of the invention are explained in greater detail on reading the following description and observing the accompanying drawings given by way of non-limiting illustration and in which.

DETAILED DESCRIPTION OF THE PREFERRED EMBODIMENTS

Figure 1:
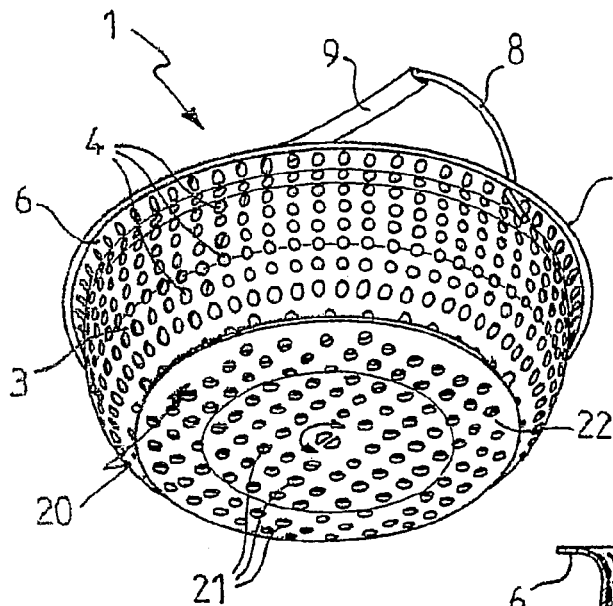
FIG. 1 is a perspective view of a cooking basket in accordance with the invention including means for adjusting steam flow rate.

The food-cooking basket of the invention is designed to be used and placed in a food-cooking appliance of the pressure cooker type, regardless of whether the pressure cooker is of the clamp, jaw, bayonet, or manhole type, without this list being considered to be limiting.

In the description below, the cooking basket of the invention is advantageously made in the form of a circular basket, without that shape being limiting, it being possible for cooking baskets in accordance with the invention to be of a shape other than circular, and for example rectangular, square, etc., without thereby going beyond the ambit of the invention.

The food-cooking basket 1 shown in FIGS. 1 to 6, 9 and 10 is for use in pressure cooking in a pressure cooker and it is constituted by a sheet of rigid material defining a bottom 2 and side walls 3 of the basket 1, said sheet being provided with perforations 4.

In the meaning of the invention, the rigid material may be based on any material capable, durably and continuously, of withstanding being used in a pressure cooker where it comes into contact with food, of being subjected to successive and repeated cleaning operations, and of being subjected to operations of raising its temperature and pressure.

Advantageously, the rigid sheet material is made of metal, and advantageously of stainless steel, it nevertheless being understood that other types of material, and in particular plastics materials could be envisaged, without thereby going beyond the general ambit of the invention.

According to an important characteristic of the invention, the perforations 4 are arranged, through the bottom 2 and the side walls 3, so as to represent at least 30% of the total area of the sheet constituting the basket and forming its total area.

It has been found that below this percentage representing the ratio between the surface area of the sheet forming the container proper and the perforations 4, it becomes difficult to make the basket industrially, and above all the effects relating to reducing cooking time and retaining vitamins in the food contained in the basket 1 are not good or beneficial.

Advantageously, the perforations 4 in the side walls 3 are made in substantially regular manner over the bottom 2 and from the bottoms of the side walls 3 adjacent to the bottom 2, and occupying substantially the entire circumference of the side walls up to a determined height.

It has been found that the vitamin-retaining effect and the reduction in cooking time are more significant when the perforations 4 are situated in the lower portion of the basket 1 up to a determined height corresponding substantially to the depth of the food present in the cooking basket 1.

Preferably, the perforations 4 represent at least 35% of the total area of the sheet, and preferably they represent 35% to 58%.

In a particularly advantageous manner, and as shown in FIGS. 1 to 6, 9 and 10, the perforations 4 are distributed substantially uniformly over and through the bottom 2 and the side walls 3. It has been found that best results are obtained with a basket having perforations 4 in its bottom 2 and over a significant height of its side walls 3.

As shown in FIGS. 1 to 6, 9 and 10, and in a preferred variant, the perforations 4 in the side walls 3 are made all the way up to the top edge 6 of said side walls 3 so as to obtain a cooking basket whose entire surface area is regularly perforated.

As shown in the figures, the perforations 4 are advantageously substantially circular, having a diameter, or equivalent diameter of not less than 3 millimeters (mm), and preferably lying in the range 3 mm to 5 mm. Nevertheless, the perforations 4 could be of other shapes and of greater size, without thereby going beyond the ambit of the invention.

In the meaning of the invention, the term "equivalent diameter" is used to mean the diameter of circular perforations 4 that would have the same area as perforations 4 that are not circular.

Whether circular or otherwise, the perforations 4 are disposed at regular distances apart, for example with a regular pitch lying in the range 5 mm to 8 mm, the thickness of the sheet of rigid material being, for example, about 0.8 mm to 0.4 mm, and preferably being about 0.5 mm.

As shown in the figures, the perforations 4 may be disposed in regular lines or in preferred dispositions known as T- or U- or M- or Z-configurations depending on the geometrical arrangement of the perforations relative to one another.

As shown in particular in FIGS. 1 to 4, 9 and 10, the food-cooking basket 1 in accordance with the invention is characterized by the fact that with perforations 4 being made through the bottom 2 and the side walls 3, said basket is provided with means 20 for adjusting the flow rate of steam passing through the basket via the perforations 4, said means being associated with the bottom 2 in such a manner as to adjust the passage of steam through the perforations 4, at least in said bottom 2, which adjustment may be discontinuous (no passage at all or passage through the full sections of the perforations 4) or continuous (with the extent to which the perforations 4 are uncovered or closed being adjusted progressively).

With food, and in particular with vegetables presenting a very large heat exchange area relative to their mass, for example spinach or even green beans, it has been found that the improvement in vitamin C retention is itself considerably improved by obstructing the perforations 4 through the bottom 2 of the basket when cooking under steam pressure without immersion. This improvement in vitamin retention is obtained without increase in cooking time (see Table 1).

Advantageously, the adjustment means 20 (FIGS. 1 to 5) are movable relative to the bottom and comprise orifices 21 enabling the user to completely uncover the perforations 4 (FIG. 4) or to cover them partially, or to cover them totally (FIG. 5), by adjusting the position of said means 20.

The adjustment means 20 are mounted to move relative to the bottom 2 by any conventional means, for example to move in translation, e.g. by means of a central pivot pin or by any equivalent means (rivets or other means, for example), the adjustment means 20 being suitable for positioning inside or outside the basket 1, i.e. on or under the bottom 2. Advantageously, the adjustment means 20 are disposed under the bottom 2 as shown in the figures.

As shown in the figures, the adjustment means 20 are advantageously constituted by a piece of material matching the shape of the bottom 2, so as to cover said bottom substantially completely. As shown, the piece forming the adjustment means 20 fits as closely as possible to the shape and configuration of the bottom 2, and may be planar or may present undulations or curves without thereby going beyond the ambit of the invention.

The adjustment means 20 is provided with orifices 21 of size and distribution identical to the size and distribution of the perforations 4 present at least through the bottom 2, so as to make it easier to bring into alignment with the perforations 4 or so as to cover them completely or partially.

As shown in the figures, for a circular basket 1, the adjustment means 20 are formed by a disk 20A, e.g. a metal disk or a disk made of any material that withstands high temperature well, the disk possibly being flat and the orifices 21 being circular.

Figure 2:
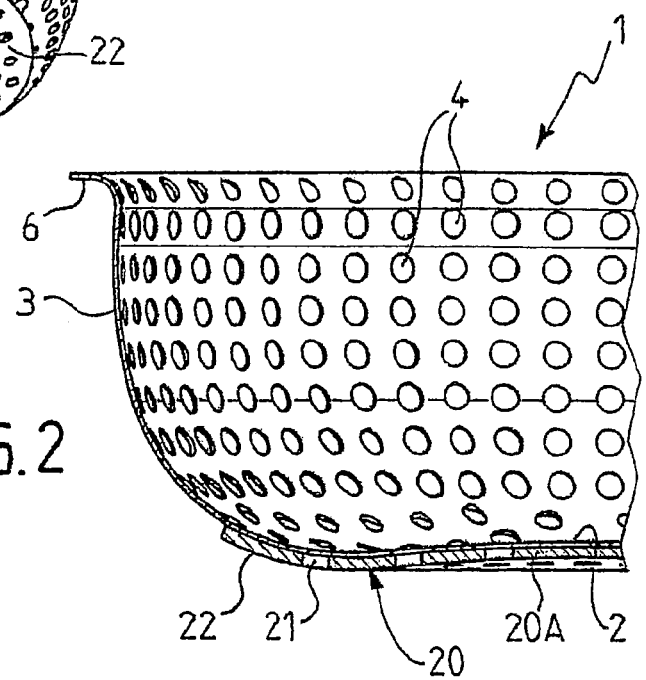
FIGS. 2 and 2A are respectively a fragmentary side view in section and a side view showing a cooking basket in accordance with the invention having its bottom associated with means for adjusting steam flow rate.
Figure 2A:
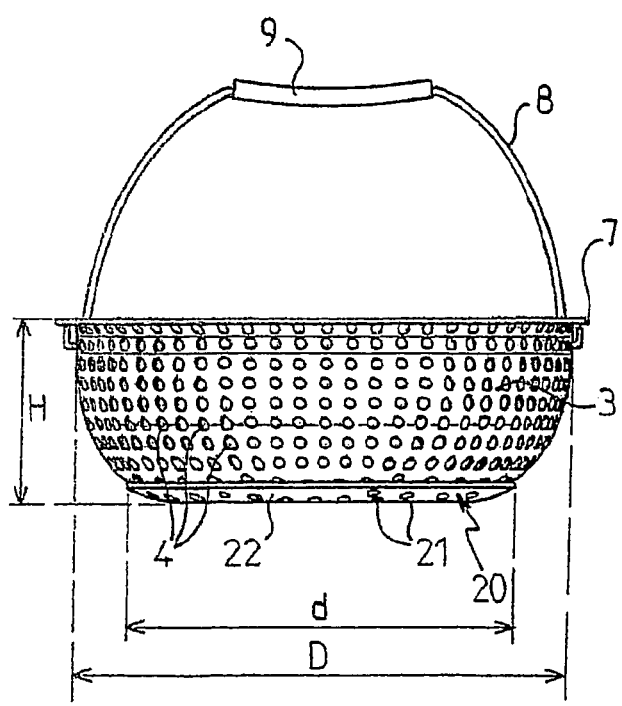
Figure 3:
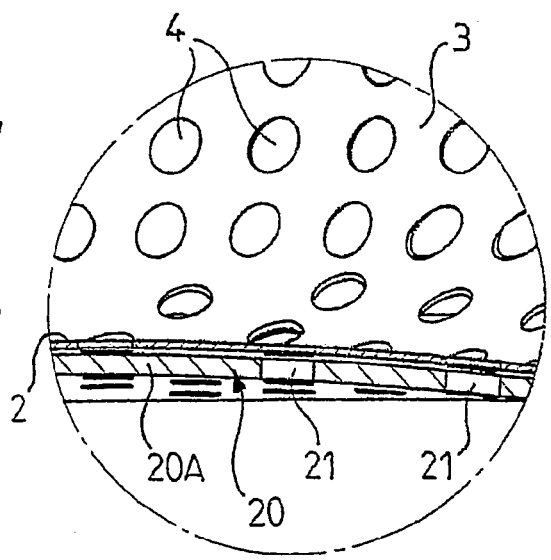
FIG. 3 is a fragmentary section view showing an embodiment detail of the bottom of a basket in accordance with the invention associated with means for adjusting steam flow rate in accordance with the invention.
Figure 4:
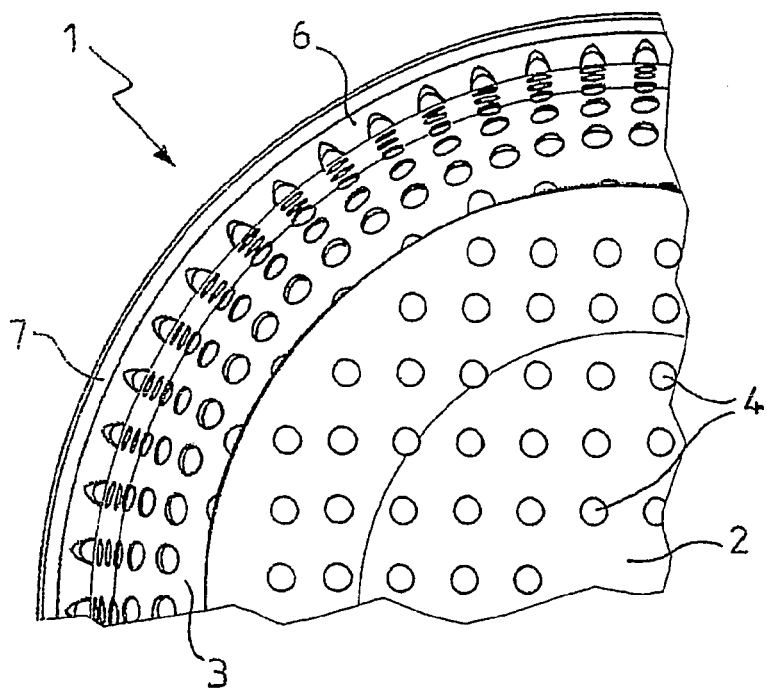
FIG. 4 is a fragmentary plan view of a cooking basket in accordance with the invention in which the orifices of the means for adjusting the steam flow rate are in alignment with the perforations in the basket.
Figure 9:
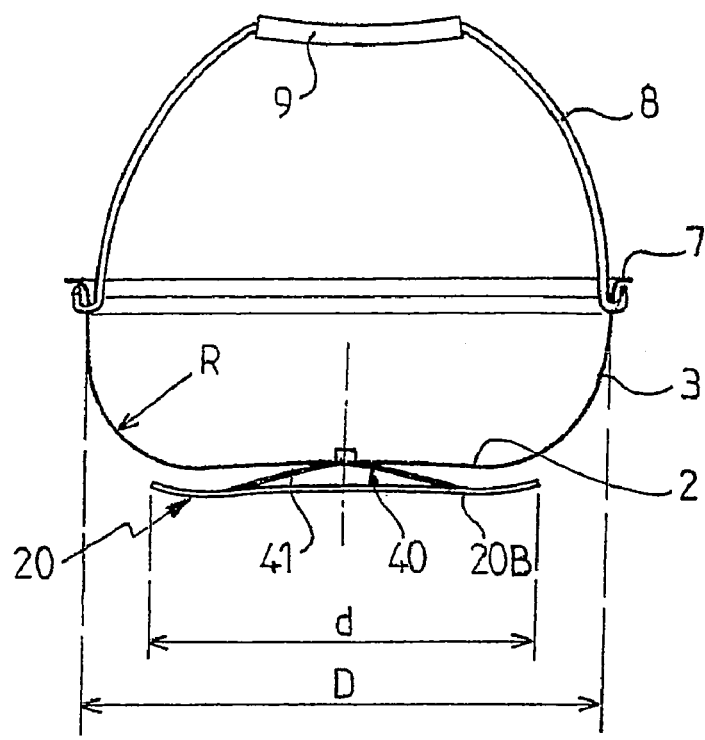
FIGS. 9 and 10 are cross-section views showing a variant embodiment of the invention using means for adjusting the flow rate of steam that are sensitive to temperature, said means being shown respectively in a working position and in a rest position.

As shown in FIGS. 2A and 9, the junction between the bottom 2 and the side walls 3 is advantageously made in such a way as to present regular curvature, for example a radius of curvature R that is greater than or equal to H/2. It has been found that maintaining a radius of curvature helps reduce internal disturbances due to the cooking steam, which might otherwise tend to hinder proper lifting of the safety devices of the pressure cooker, and in particular of the safety and locking valve(s).

Advantageously, the basket 1 of the invention is circular in section with a diameter D (outside the basket) and a height H substantially equal to ⅓ D.

Advantageously, when the adjustment means 20 are formed by a disk and when the junction between the bottom 2 and the side walls 3 presents a radius of curvature R, the disk 20A and its orifices 21 extend in part over the radius of curvature R, as can be seen in FIG. 2. According to this feature, the edge portion 22 of the disk forms an annular portion which advantageously has the same radius of curvature R as the basket, with the disk and its orifices 21 extending over a fraction only of the curved portion, preferably over about ¼ R, the diameter d of the fitted cup being substantially about ¾ D.

In a variant, and without going beyond the ambit of the invention, the adjustment means 20 could be formed merely by a sheet or film of porous material that is sufficiently porous to reduce the rate at which steam flows through the perforations 4 in the bottom 2. Under such circumstances, the porosity of the sheet should be sufficient to obstruct or impede fully or partially, depending on its porosity, the passage of steam through the perforations 4 in the bottom 2. In this variant, the user cannot adjust the flow of steam by moving the sheet, the extent to which steam passes through being predetermined as a function of the porosity of the sheet.

However, the user can be provided with a set of several sheets of different porosities, for placing in the pressure cooker against the bottom 2 as a function of the food or as a function of the desired steam flow rate.

As shown in FIGS. 1 to 6, 9 and 10, the side walls 3 are terminated at their top end by a curved edge 6 extending radially outwards from the basket away from its axis of symmetry, and of constant width over its entire periphery, i.e. of constant peripheral width. This feature enables the cooking appliance to be positioned without any particular angular indexing in the cooking vessel of the pressure cooker. Furthermore, the presence of a continuous curved edge 6 matching the shape of the inside wall of the vessel of the pressure cooker (ignoring the clearance necessary for insertion of the basket) forces the steam to pass through the basket, and thus through the food, thereby optimizing heat transfer.

The curved edge 6 is advantageously provided with a peripheral ring 7, e.g. made of metal, which is fitted to and folded over said edge so as to increase the rigidity of the basket and improve its finish.

As shown in FIG. 1, the basket of the invention has a handle 8 mounted to pivot between a handle-supporting position, as shown in FIG. 1, and at least one rest position where it rests on the top edge 6 of the basket, substantially following the periphery of the edge. In this configuration, the handle 8 is substantially semicircular.

Advantageously, and in accordance with the invention, the handle 8 includes a grip portion 9 substantially in its center, which grip portion is set back towards the inside compared with the remainder of the handle so that it does not rest on said edge 6.

The grip portion 9 is curved and forms a regularly curved portion defining a concave portion 9A facing towards the outside of the basket and a convex portion 9B facing towards the inside of the basket. This feature makes it much easier to take hold of the handle while avoiding burning the fingers.

Figure 10:
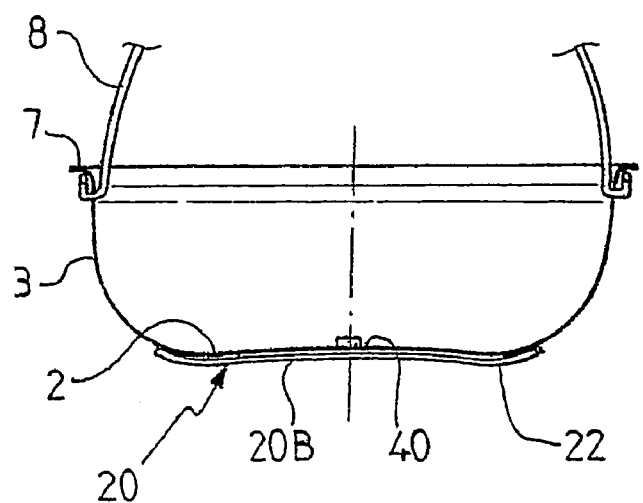

The variant embodiment shown in FIGS. 9 and 10 differs from the other variants in that the adjustment means 20 are mounted to move relative to the bottom 2 via means 40 that are temperature sensitive, so as to uncover the perforations 4 in the bottom as soon as a preestablished temperature is reached. The adjustment means 20 are located inside the basket 1, or preferably outside the basket against and over the outside face of its bottom 2. The adjustment means 20, e.g. a solid metal or plastics disk 20B (i.e. a disk having no orifices) is connected and mechanically secured to the bottom 2, e.g. by means of a pin and/or by the temperature-sensitive means, substantially in its central portion and it is free to move relative thereto reversibly between two stable positions. The first position (FIG. 10) in which the disk 20B presses against the bottom 2 corresponds to a rest position at the beginning of cooking (temperature $T_1$ is ambient or low), and in this position the disk 20B completely shuts off the perforations 4. The second position (FIG. 9) is a position in which the disk 20B is spaced apart from the bottom 2 and it corresponds to a working and cooking position (high temperature $T_2>T_1$), the perforations 4 then being completely uncovered. Changeover from the rest position to the working position is reversible and is achieved by the temperature sensitivity of the means 40. Advantageously, said means are means that change shape or state depending on the temperature to which they are subjected, for example a bimetallic piece 41. Under the effect of the cooking temperature, and as soon as its change-of-shape temperature $T_2$ is reached, the bimetallic piece 41 deforms (FIG. 9) and moves the disk 20B into its working position.

Figure 6:
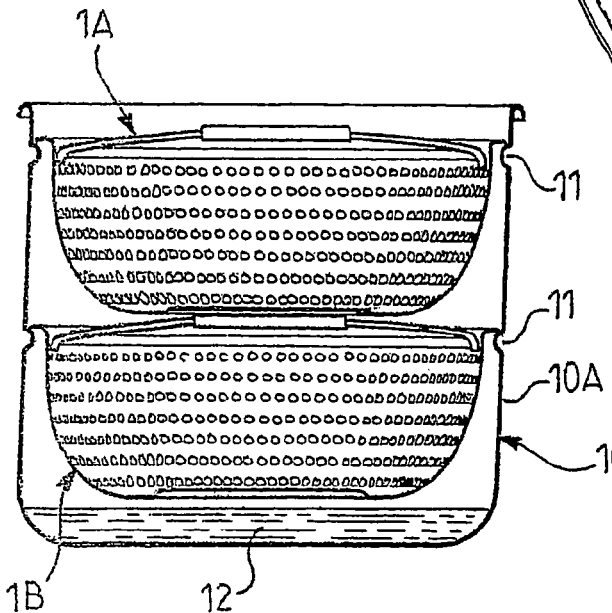
FIG. 6 is a cross-section view showing a pressure cooker of the invention containing two cooking baskets in accordance with the invention in a superposed position.
Figure 7:
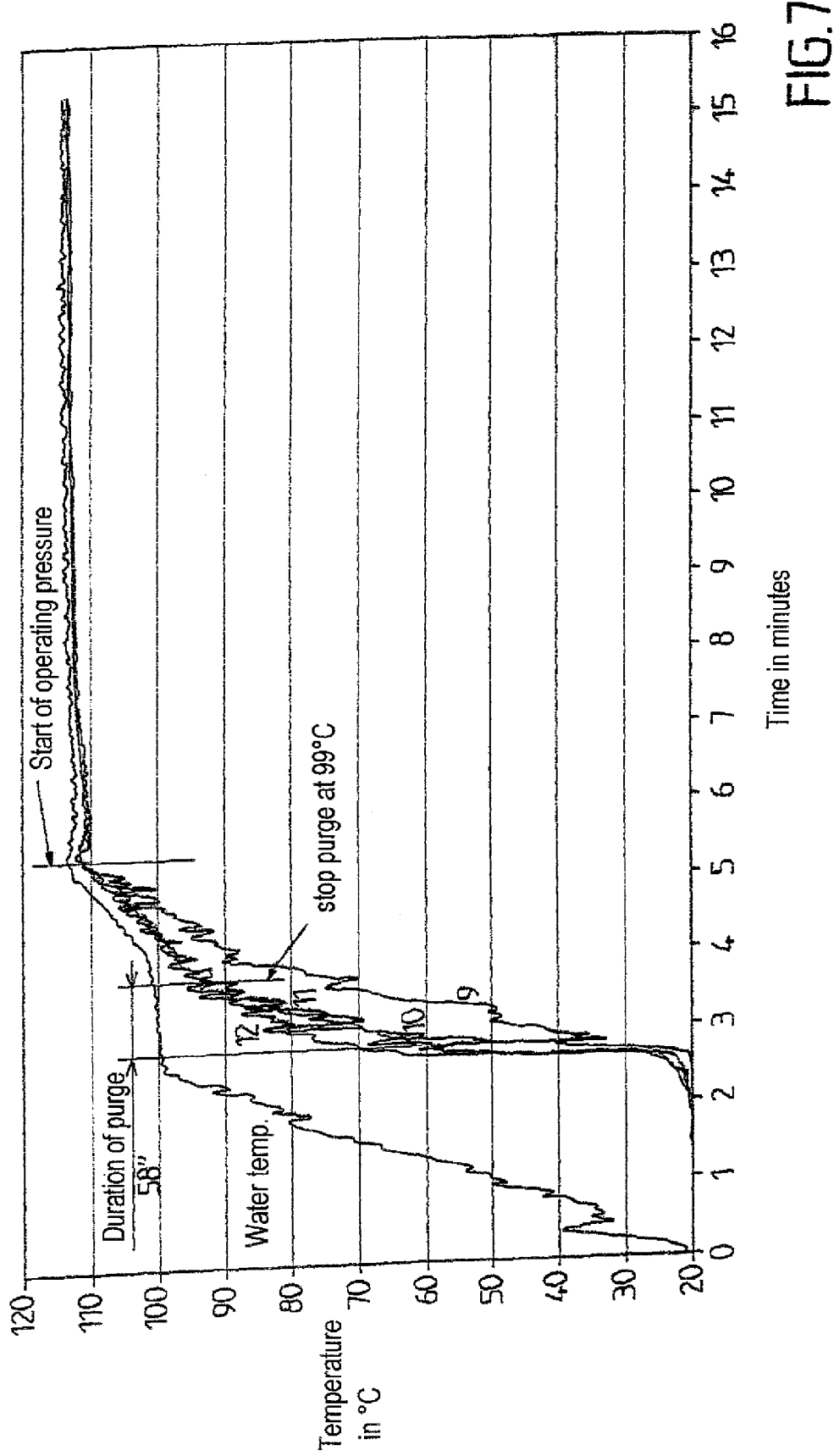
FIG. 7 shows the uniformity of temperature rise in food within a cooking basket of the invention.
Figure 8:
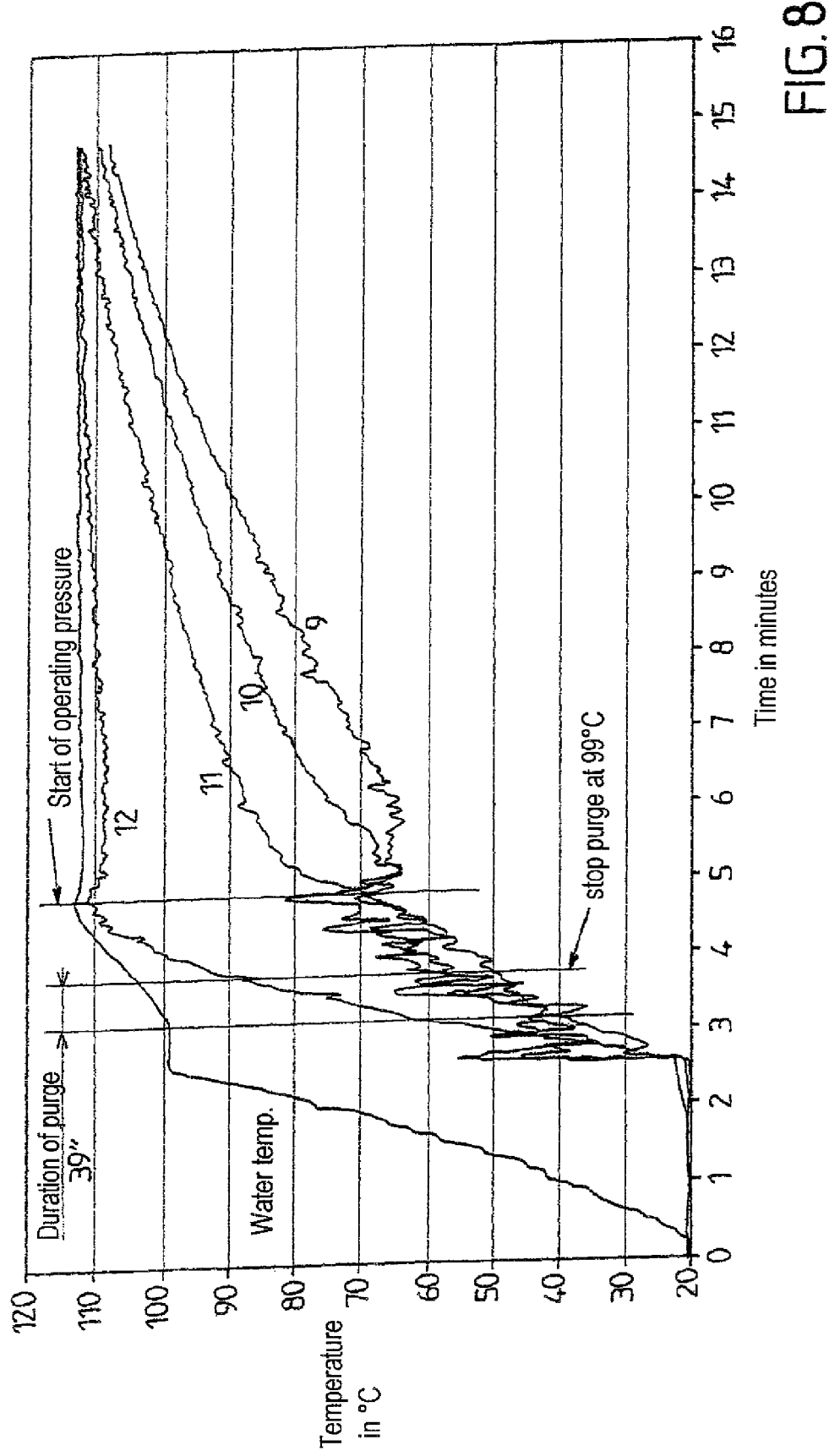
FIG. 8 is a graph on a basis comparable to that of FIG. 7, showing the non-uniformity of temperature rise in food contained in a prior art cooking basket.

As shown in FIG. 6, the cooking basket 1 is for placing in a vessel 10 of a pressure cooker provided with a cover (not shown in the figures) so as to perform pressure cooking.

The pressure cooker of the invention comprises a vessel 10 having support means 11 for supporting the basket 1 in the vessel, said support means 11 being formed radially in or from the walls 10A of the vessel. These support means 11 are well known to the person skilled in the art and may be constituted by indentations (or similar means) obtained by pressing or deforming the wall, as described in patent FR-2 783 685 in the name of the Applicant, for example. In this configuration, the cooking basket 1 of the invention is placed in the vessel 10 so that its rim 6 rests against the support means 11 that are angularly distributed at the same height on the side walls 3.

As shown in FIG. 6, the support means 11 are at a sufficient predetermined height from the bottom 10B of the vessel 10 for the basket 1 to remain at a distance from said bottom 10B and from any liquid 12 contained in the vessel 10.

According to an important characteristic of the invention, the pressure cooker of the invention comprises a vessel 10 having at least two rows of support means 11 disposed at different reference heights so as to enable at least two cooking baskets to be disposed in a superposed configuration inside the vessel, as shown in FIG. 4A. By means of this disposition, it is possible to place a first basket 1A in an upper position, and a second basket 1B in a lower position, neither of the baskets being immersed in the supply of liquid 12, thereby enabling food to be steam-cooked, without the food in the baskets being mixed as is the case in the prior art using a single basket.

Furthermore, the circulation of steam within the pressure cooker enclosure is controlled by controlling the density of the perforations, thus enabling different cooking to be performed without disturbing the lifting of the valve locking devices.

In particularly advantageous manner, the method of manufacturing a food-cooking basket for a pressure cooker in accordance with the invention is implemented by stamping a sheet of metal, e.g. a sheet of stainless steel.

Table 1 below compares the results of vitamin C preservation as obtained during steam cooking for various vegetables, both when cooking in a conventional, prior art basket and when cooking in a basket of the invention, with the adjustment means 20 of the invention totally obstructing the perforations 4 in the bottom 2 (basket II) or without the adjustment means 20 (basket I).

TABLE 1

|  | Spinach | Green beans |
|---|---|---|
| Time in min |  |  |
| Prior art basket | 10' | 12' |
| Basket of the invention I | 4' | 4'30 |
| Saving % | 60% | 62% |
| Vitamin C retention % |  |  |
| Basket of the invention I | 67% | 39% |
| Basket of the invention II | 89% | 46% |
| Improvement % | 32% | 18% |

The prior art basket was constituted by a perforated metal basket having orifices of about 3 mm, said orifices being provided through the bottom of the basket and occupying considerably less than 20% of the total surface area of the basket. The basket of the invention was of a form similar to the basket shown in FIGS. 1 to 6, 9 and 10 without adjustment means 20 and it had a series of orifices 4 of diameter approximately 5 mm regularly distributed over the entire surface of the basket up to the top edge 6, and representing 30% of the area of the basket.

The results show clearly that the saving in cooking time that is obtained with the vegetables in question enables cooking time to be reduced by about 57% to 83%.

Similarly, vitamin C preservation in the vegetables in question was considerably increased, since more vitamin C was observed to be retained, in an amount that varied depending on the vegetables, but which enabled an improvement in vitamin retention to be obtained lying in the range 14% to 62%.

These improved results should be compared with the specific configuration of a basket of the invention in which the size, distribution, and density of perforations 4 serves to enable optimum movement of the flow of steam, thereby encouraging excellent heat exchange throughout the mass of vegetables, thus enabling cooking to take place quickly and uniformly, which is necessary in order to obtain better vitamin retention.

Basket II of the invention was constituted by a basket similar to basket I of the invention, but having the adjustment means 20 are shown in FIGS. 2 to 5.

Figure 5:
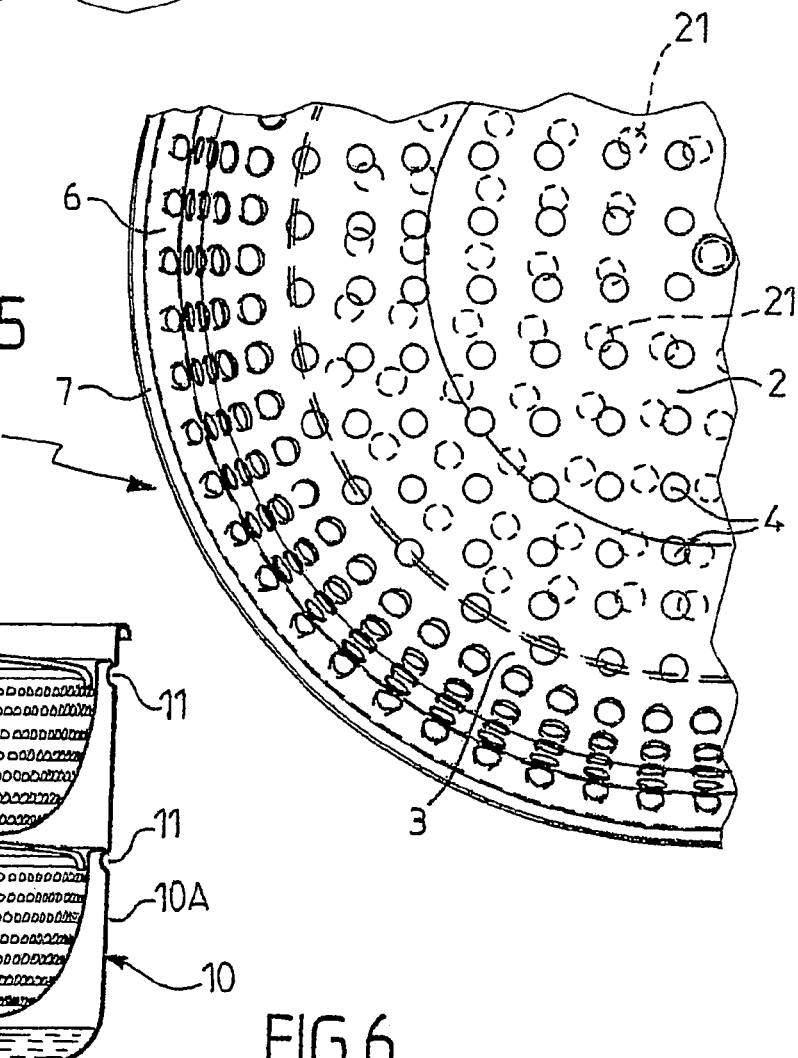
FIG. 5 is a view identical to that of FIG. 4 showing a cooking basket in accordance with the invention in which the orifices of the means for adjusting for the steam flow rate are in a position where they are totally out of alignment with the perforations of the basket so that said perforations are completely covered.

These results show that when the perforations 4 in the bottom of the basket are totally closed off by the adjustment means 20, as shown in FIG. 5, vitamin V retention rises to 89% instead of 67% (improvement 32%), and without increasing cooking time for spinach. Simultaneously, the quantity of vitamin C in the cooking water drops from 11.4% to 4.5% of the initial content of the raw spinach. Comparable results were found with green beans, while the effects with other vegetables were less marked or not yet available.

A considerable improvement in vitamin retention can nevertheless be expected for other vegetables that are sensitive to leaching, such as broccoli or cauliflower, in which vitamin C is generally disposed at the periphery of the vegetable, or in its flowers.

The two baskets had technical characteristics identical to the two above-defined baskets.

Temperature levels were measured by means of four probes distributed in the central portion of the basket at different depths within the food, and from the graphs, it can be seen that in a basket of the invention temperature rise for all of the probes was particularly uniform and fast over the time interval $t_1=2$ min 30 sec to $t_2=5$ min 30 sec, measured from the start of cooking. The final cooking temperature was obtained as from 5 min 30 sec of cooking, approximately, and it was thoroughly equal and uniform within the food, regardless of position within the basket, since the temperature measured by all four probes was identical and equal to about 110° C.

In contrast, in a prior art basket, the cooking temperature of the food was particularly non-uniform, the four temperature curves for all four probes becoming substantially equal (and even then not completely) after cooking for about 15 minutes.

During the testing, the mean cooking pressure was about 1.5 bar, each pressure cooker being fitted with a purge system enabling steam to be exhausted from the enclosure of the pressure cooker during the rise in pressure.

These graphs also show that the speed of the rise in temperature in a basket of the invention, given that once the mean operating pressure was reached at about 110° C., the entire mass of food was at the mean operating temperature of about 110° C. Conversely, in a prior art basket, the mean temperature of 110° C. was obtained only after about 14 min to 15 min of operation.

SUSCEPTIBILITY OF INDUSTRIAL APPLICATION

The invention is susceptible of industrial application in the design and manufacture of domestic cooking appliances of the pressure cooker type, and also of cooking baskets for use in association with said appliances.

The invention claimed is:

1. A food-cooking basket for pressure cooking in a pressure cooker, in which steam is generated, the steam having at least one flow rate, the basket comprising a sheet of rigid material defining a bottom and side walls of the basket, said sheet being provided with perforations that are made through the bottom and through the side walls, said basket being provided with means for adjusting the flow rate of steam passing through the basket via the perforations, said adjusting means being associated with the bottom in such a manner as to enable the flow rate of steam through the perforations at least in the bottom to be adjusted.

2. The basket according to claim 1, wherein the adjusting means are movable relative to the bottom and include orifices serving to uncover the perforations completely or partially, or to cover them completely, by adjusting the position of said adjusting means.

3. The basket according to claim 2, wherein the adjusting means are provided with orifices of size and distribution identical to the size and distribution of the perforations, at least in the bottom.

4. The basket according to claim 1, wherein the adjusting means are mounted to move relative to and over the bottom by means that are responsive to temperature in such a manner as to enable the perforations through the bottom to be uncovered as soon as a pre-established temperature is reached.

5. The basket according to claim 3, wherein the temperature-responsive means are constituted by a bimetallic piece.

6. The basket according to claim 1, wherein the adjusting means are formed by a piece of material matching the shape of the bottom so as to cover the bottom substantially completely.

7. The basket according to claim 1, wherein the basket is circular and the adjusting means are formed by a disk.

8. The basket according to claim 7, wherein the junction between the bottom and the side walls forms a curved portion having a radius of curvature R, the disk and its orifices extending in part over the curved portion.

9. The basket according to claim 8, wherein the disk and its orifices occupy ¼ R.

10. The basket according to claim 1, wherein the perforations are formed through the bottom and the side walls so as to represent from 35% to 58% of the sheet, said perforations presenting an equivalent diameter of not less than 3 mm.

11. The basket according to claim 1, wherein the adjusting means are formed by a film of porous material of porosity sufficient for reducing the flow rate of steam through the perforations in the bottom.

12. The basket according to claim 1, wherein the adjusting means are disposed inside or outside the basket, on or under the bottom.

13. A pressure cooker fitted with the basket according to claim 1.

* * * * *